United States Patent
Hadji-Abdolhamid et al.

(10) Patent No.: US 9,553,615 B2
(45) Date of Patent: *Jan. 24, 2017

(54) RECEIVER FOR CARRIER AGGREGATION

(71) Applicant: BROADCOM CORPORATION, Irvine, CA (US)

(72) Inventors: Amir Hadji-Abdolhamid, Aliso Viejo, CA (US); Bernd Pregardier, Oceanside, CA (US); Masoud Kahrizi, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/054,335

(22) Filed: Feb. 26, 2016

(65) Prior Publication Data

US 2016/0182094 A1 Jun. 23, 2016

Related U.S. Application Data

(63) Continuation of application No. 14/066,830, filed on Oct. 30, 2013, now Pat. No. 9,287,901.

(60) Provisional application No. 61/880,318, filed on Sep. 20, 2013.

(51) Int. Cl.
*H04B 1/16* (2006.01)
*H04B 1/00* (2006.01)
*H04W 88/06* (2009.01)

(52) U.S. Cl.
CPC .......... *H04B 1/0067* (2013.01); *H04B 1/0057* (2013.01); *H04B 1/16* (2013.01); *H04W 88/06* (2013.01)

(58) Field of Classification Search
CPC ......... H04B 1/00; H04B 1/005; H04B 1/0057; H04B 1/0067; H04B 1/16
USPC .................. 455/132, 133, 140, 188.1, 187.1, 189.1,455/193.1, 574
See application file for complete search history.

(56) References Cited

U.S. PATENT DOCUMENTS

| | | | | |
|---|---|---|---|---|
| 7,995,684 B2* | 8/2011 | Montojo | .............. | H03G 3/3036 375/130 |
| 8,416,758 B1* | 4/2013 | Rousu | ...................... | H04B 1/18 370/343 |
| 8,792,830 B2* | 7/2014 | Lim | ........................ | H04L 25/02 375/260 |
| 8,954,019 B2* | 2/2015 | George | ................ | H04B 1/0057 455/130 |
| 9,325,553 B2* | 4/2016 | Kaukovuori | ......... | H04B 1/0057 |
| 2014/0018026 A1* | 1/2014 | Klepser | .................. | H04B 1/005 455/230 |
| 2014/0355526 A1* | 12/2014 | Kahrizi | ..................... | H04L 5/00 370/329 |

* cited by examiner

*Primary Examiner* — Blane Jackson
(74) *Attorney, Agent, or Firm* — Garlick & Markison; Randy W. Lacasse

(57) ABSTRACT

A single hybrid receiver is provided for processing both single carrier and carrier aggregated (CA) communications signals where carriers are split into independent receive paths without any additional external components. The receiver receives all contiguous and non-contiguous intra-band CA and inter-band CA signals, including those of unequal bandwidths, allowing for improved rejection and balanced rejection of jamming signals on either side of the two carrier signals.

20 Claims, 7 Drawing Sheets

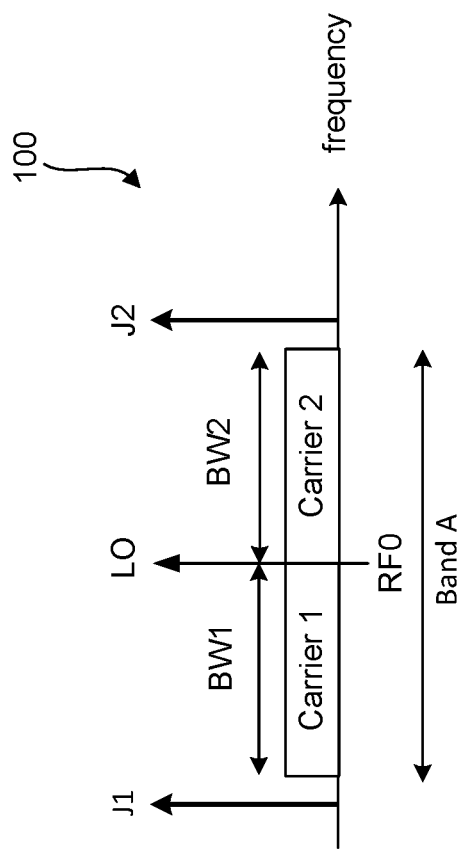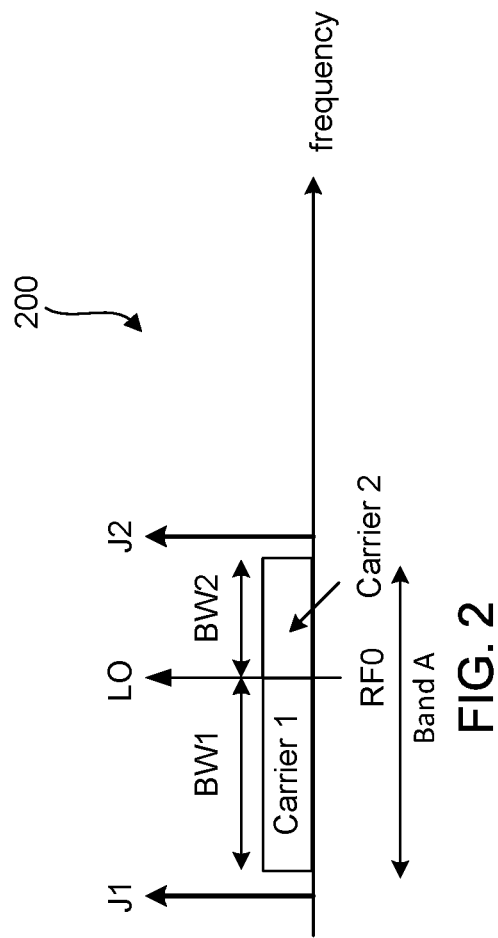

RECEIVER FOR CARRIER AGGREGATION

CROSS REFERENCE TO RELATED PATENTS/PATENT APPLICATIONS

The present U.S. Utility patent application claims priority pursuant to 35 U.S.C. §120 as a continuation of U.S. Utility application Ser. No. 14/066,830, entitled "Receiver for Carrier Aggregation," filed Oct. 30, 2013, which claims priority pursuant to 35 U.S.C. §119(e) to U.S. Provisional Application No. 61/880,318, entitled "Receiver for Carrier Aggregation," filed Sep. 20, 2013, both of which are hereby incorporated herein by reference in their entirety and made part of the present U.S. Utility patent application for all purposes.

BACKGROUND

Technical Field

The present disclosure described herein relates generally to wireless communications and more particularly to receivers used to support wireless communications.

Description of Related Art

Communication systems are known to support wireless and wireline communications between wireless and/or wireline communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, 3GPP (3rd Generation Partnership Project), 4GPP (4th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), and/or variations thereof.

Depending on the type of wireless communication system, a wireless communication device, such as a cellular telephone, smartphone, two-way radio, tablet, personal digital assistant (PDA), personal computer (PC), laptop computer, home entertainment equipment, RFID reader, RFID tag, et cetera communicates directly or indirectly with other wireless communication devices. For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to one or more antennas (e.g., MIMO) and may include one or more low noise amplifiers, one or more intermediate frequency stages, a filtering stage, and a data recovery stage. The low noise amplifier(s) receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out-of-band signals to produce filtered signals. The data recovery stage recovers raw data from the filtered signals in accordance with the particular wireless communication standard.

BRIEF DESCRIPTION OF THE SEVERAL VIEWS OF THE DRAWING(S)

FIG. 1 illustrates a diagram for an example contiguous CA with two carriers of identical bandwidth (BW) in accordance with the present disclosure;

FIG. 2 illustrates a diagram for another example contiguous CA with two carriers of unequal bandwidth in accordance with the present disclosure;

DETAILED DESCRIPTION

Figure 3:
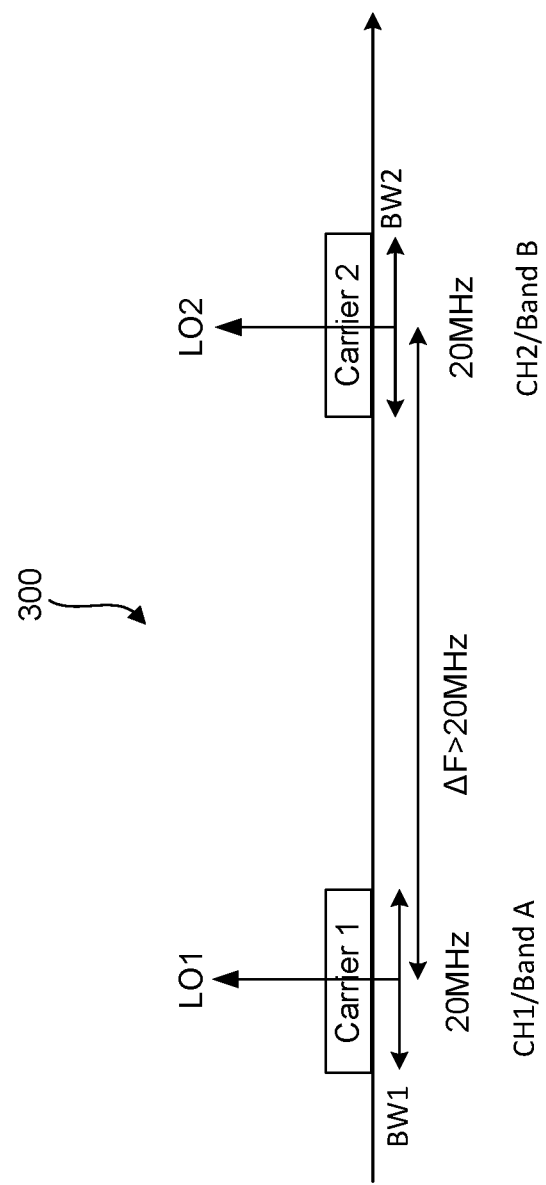
FIG. 3 illustrates a diagram for an example non-contiguous CA with two carriers of equal bandwidth in accordance with the present disclosure.

In LTE, receiving bandwidths can be further extended by means of carrier aggregation (CA), where multiple carriers can be aggregated and jointly used for transmission to/from a single terminal. Carrier signals involve a carrier frequency that represents a center frequency of a radio frequency channel. There are two cases: contiguous CA (CCA) and non-contiguous CA (NCCA). In CCA, carrier signals occupy contiguous channels. While in NCAA, carrier signals occupy non-contiguous elements of spectrum in the same frequency, and often include aggregation of clusters of one or more contiguous carriers.

Currently, CCA supports, for example, up to 5 carriers with a maximum bandwidth of 20 MHz per carrier. An additional aspect is that the bandwidth of the carriers does not need to be identical. For example, the first carrier can have 20 MHz bandwidth, while the second one has only 5 MHz. For NCCA, the carriers are spaced apart with some frequency gap; they can have different BW per carrier (for example 5 MHz and 20 MHz). In addition, CA can be combined with downlink multiple-in, multiple-out (MIMO) which in turn uses additional receivers in a diversity path, but frequency generation blocks can be shared between main and diversity path for each carrier. While the present disclosure concentrates on the main receive path, additional receive paths, carriers and bandwidths are within the scope of the technology described herein.

FIG. 1 illustrates a diagram for an example intra-band contiguous CA (contiguous in the same band) with two carriers of identical bandwidth (BW) in accordance with the present disclosure. Diagram 100 provides a scenario where the two carriers (carrier 1 and carrier 2) have identical channel bandwidths (i.e., BW1=BW2). The main receiver simply treats this scenario as if the two carriers are a single carrier with a total BW (Band A) twice that of BW1. A local oscillator (LO) signal is placed in between the two carriers (at RF0). The analog filter BW extends to ≥BW1. The analog-to-digital conversion has high enough signal-to-noise-and-distortion ratio (SNDR) to handle such a wideband signal. The two carrier signals are split into two independent signals after an analog-to-digital signal conversion in the digital baseband. Two signals (J1 and J2) represent two jamming signals and could be narrow or wideband. The spacing of the jamming signals to the edge of the carriers is, for example, equal as generally defined by the specifications of 3GPP.

FIG. 2 illustrates diagram 200 for another example of intra-band contiguous CA with two carriers of unequal bandwidth in accordance with the present disclosure. As opposed to the intra-band contiguous CA (Band A) illustrated in FIG. 1, in some cases the carrier bandwidths are not equal (e.g., BW1> or <BW2). For unequal carrier bandwidths, the LO still is placed between the radiofrequency (RF) carriers (carrier 1 and carrier 2). After down-conversion to the in-phase/quadrature baseband components, the analog filter BW is wide enough to accommodate the wider of the two carriers (i.e., BW1 in this case). As a result, J2, the jamming signal on carrier 2 side, is exposed to less filtering when compared to J1, which can lead to degradation of the signal-to-noise ratio (SNR) of both carriers. Additionally, this scenario requires a high-level of image rejection due to jamming signal J2. In one or more embodiments, LO can be set in the middle of carrier 1 and carrier 2. However, then there will be some performance degradation on the sub-carrier at LO frequency caused by DC offset or 1/f noise.

FIG. 3 illustrates a diagram for an example non-contiguous carrier aggregation (NCCA) with two carriers of equal bandwidth in accordance with the present disclosure. Diagram 300 provides a scenario where two aggregated carriers (carrier 1 and carrier 2) have identical channel bandwidths (e.g., BW1=BW2), but are non-contiguous (separated). NCCA may be implemented as intra-band or inter-band. In an intra-band configuration, the two aggregated carriers are in the same band (Band A), but separated into different channels (CH1 and CH2). In an inter-band configuration, the two aggregated carriers are separated into multiple bands (Band A and Band B). The non-contiguous carrier signals are typically separated by a frequency region (e.g., >20 MHz as shown). Also, there can be jammer or an unwanted signal in the frequency region that separates the Non-contiguous carriers. Use of single LO to down-convert Non-contiguous carrier (similar to CCCA case) requires ADC to handle wider bandwidth. In addition, receiver circuit has to be implemented to handle the large level of the jammer. This approach makes the receiver design more complex and more costly.

Figure 4:
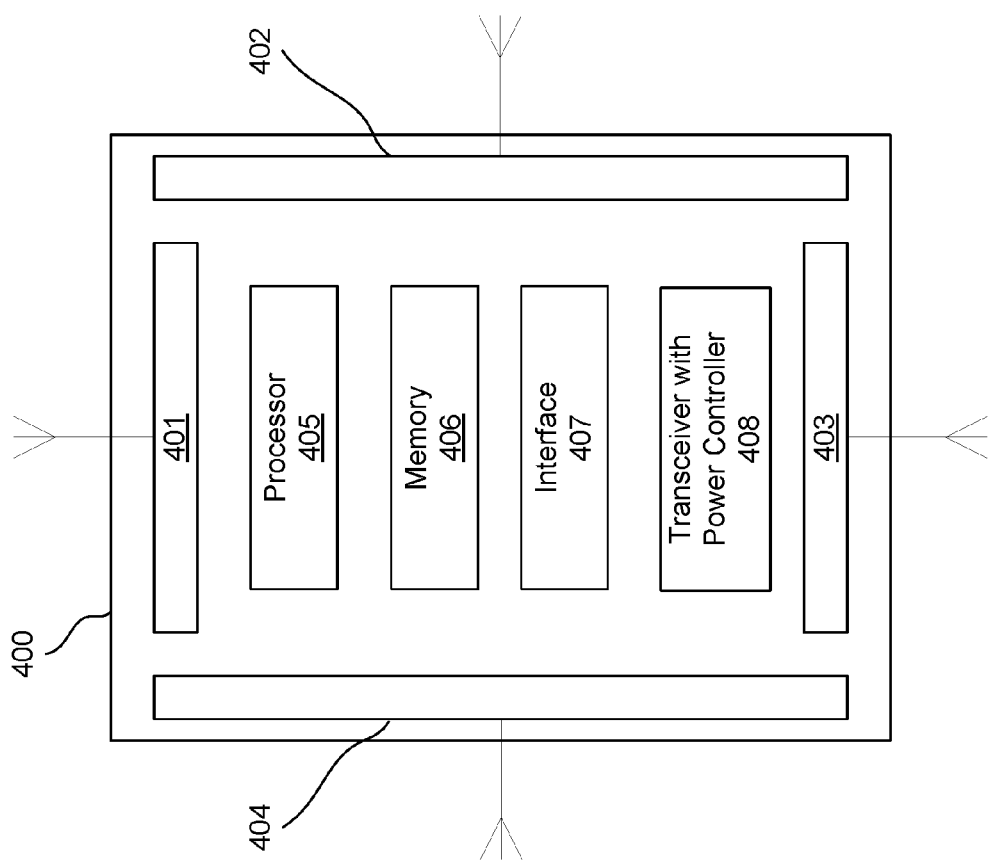
FIG. 4 illustrates a schematic block diagram of cellular communications device circuitry for a mobile communications device in accordance with the present disclosure.

FIG. 4 illustrates a schematic block diagram of cellular communications device circuitry for a mobile communications device in accordance with the present disclosure. Cellular capable wireless communications devices are typically constructed with multiple antennas that support various communications protocols. In one embodiment, mobile communications device 400 includes: cellular antenna 401 (e.g., 3G, 4G, LTE, etc.), accessory antenna 402, diversity antenna 403 and multi-use WLAN/Bluetooth (BT) antenna 404. In one or more embodiments, accessory antennas include, but are not limited to, Global Positioning System (GPS), Near Field Communications (NFC) and other short-range communication protocol antennas.

Mobile communications device 400 also includes processor module 405 to process both communication and non-communication functions of the mobile communications device (e.g., antenna allocation). In addition, communication and non-communication data is stored in memory 406. Interface 407, in conjunction with processor module 405, includes processing of visual and non-visual external and internal data. Wireless communications device 400 also includes one or more transceiver modules (transmitter and receiver) 408 each with one or more radio signal processing paths including power control (ON/OFF). The power controller functionality can be integrated within the transceiver, be separate, or be performed by the processor.

Figure 5:
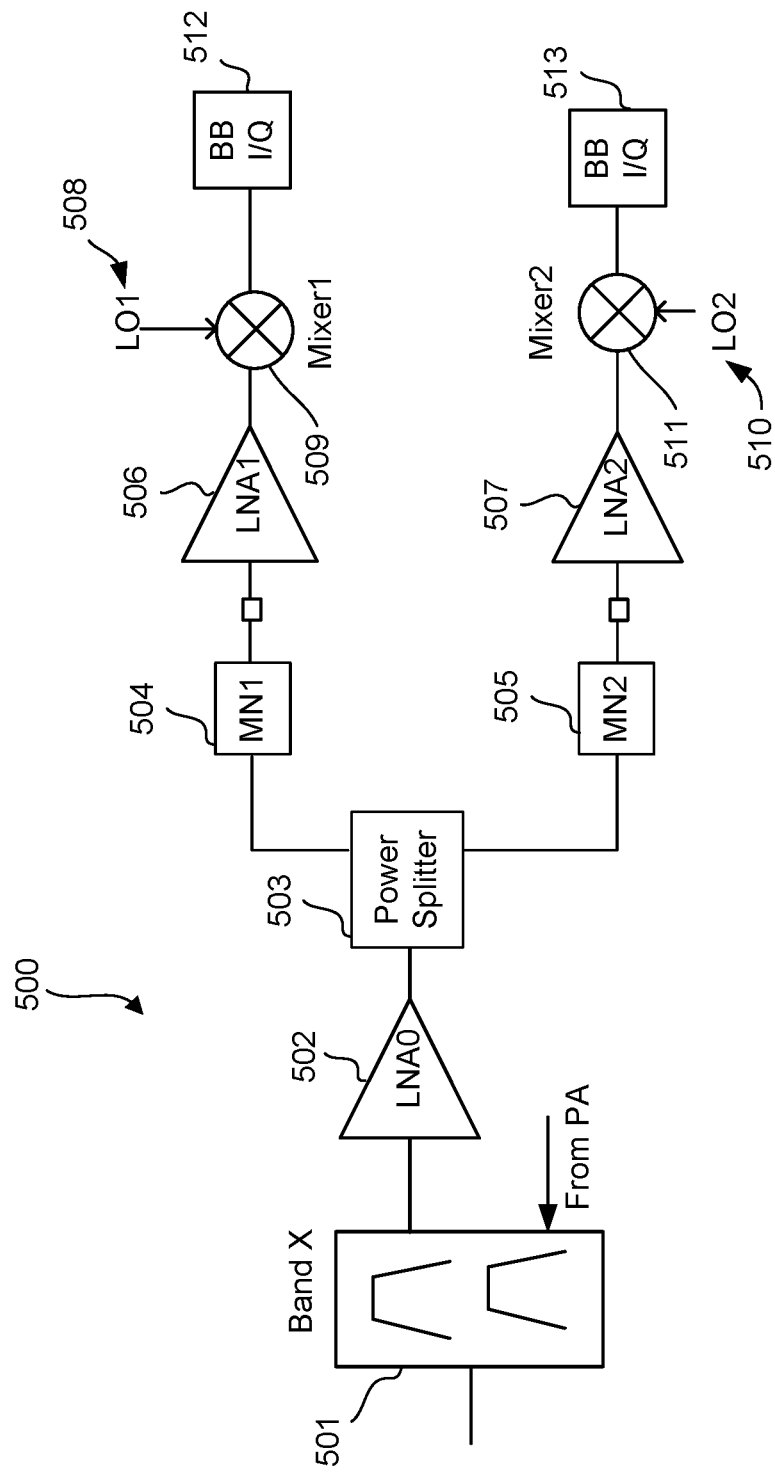
FIG. 5 illustrates a receiver circuit diagram for handling non-contiguous carrier aggregation with two carriers in accordance with the present disclosure.

FIG. 5 illustrates a receiver circuit diagram for handling non-contiguous carrier aggregation with two carriers in accordance with the present disclosure. Receiver circuit 500 includes non-contiguous carrier (NCCA) aggregated RF signals as received by one or more antennas (e.g., as shown in FIG. 4). The NCCA signals pass through external common filter 501 (or duplexer), external low-noise amplifier (LNA0) 502 and into power splitter 503. Power splitter 503 splits the two carrier signals into two independent radiofrequency (RF) paths. Each RF path undergoes impedance matching performed by (external) matching networks (MN1 and MN2) 504 and 505, respectively, optimized for a certain band (here denoted as band X). The signals are amplified by low-noise amplifiers (LNA1) 506 and (LNA2) 507, respectively. The amplified signals are down-converted by mixers (mixer1) 509 and (mixer2) 511 with associated local oscillators (LO1) 508 and (LO2) 510 producing independent baseband signals 512 and 513 (BB I/Q (baseband in-phase/quadrature)). External LNA0 502 and power splitter 503 are used to maintain a good noise figure while driving the two independent RF paths.

Figure 6:
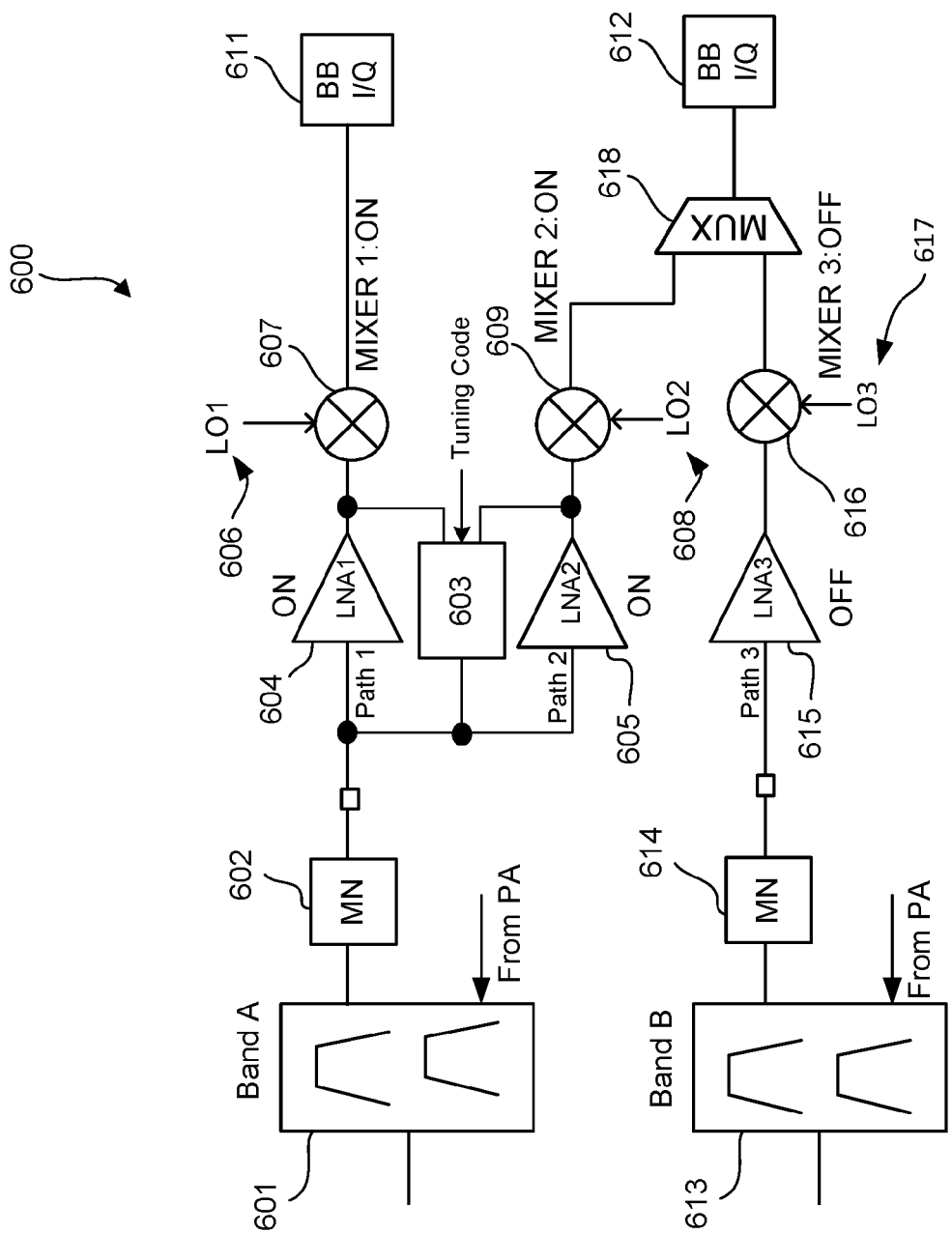
FIG. 6 illustrates a circuit diagram embodiment for a hybrid intra-band/inter-band CA receiver in accordance with the present disclosure.
Figure 7:
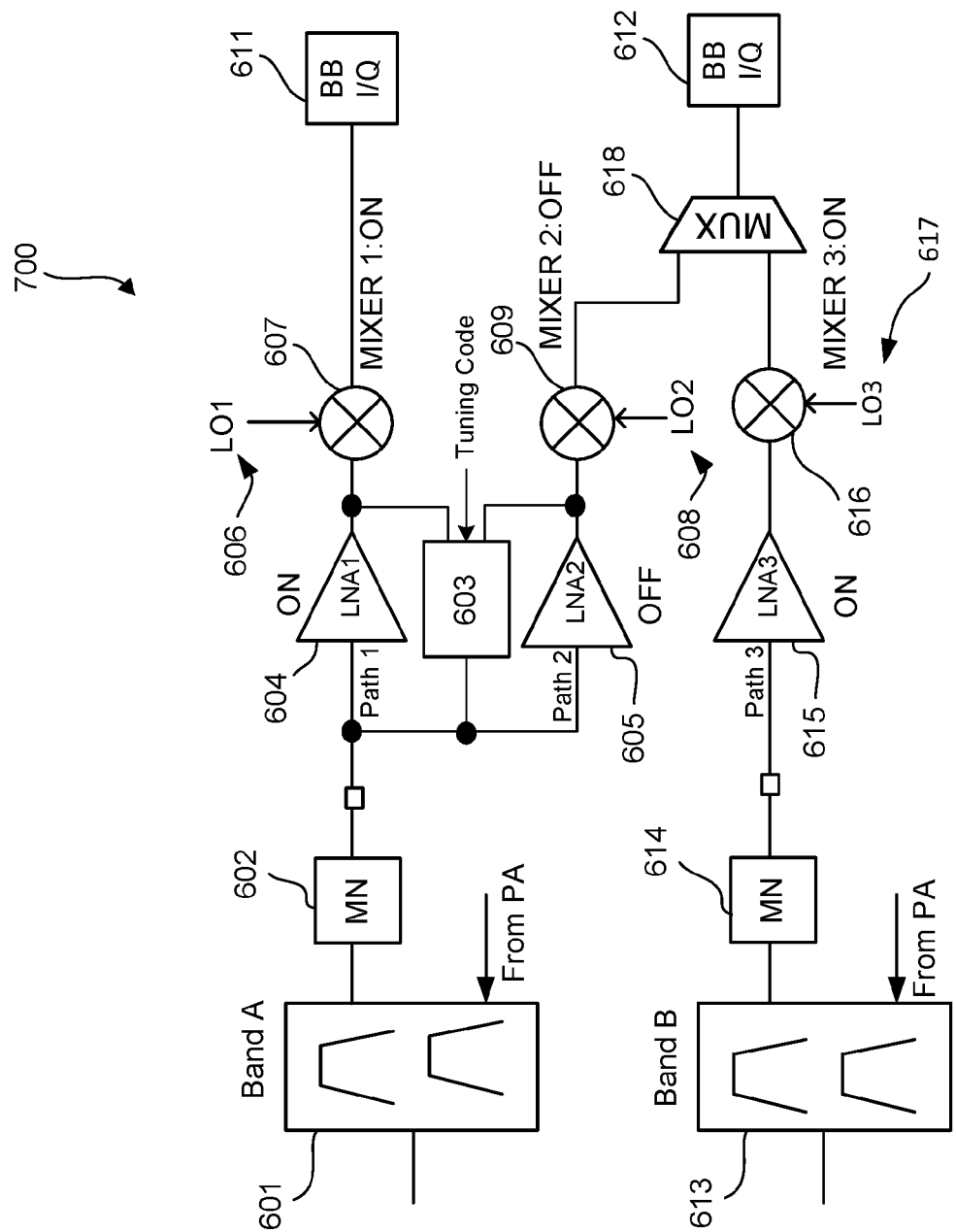
FIG. 7 illustrates an aspect embodiment of a circuit diagram for a hybrid intra-band/inter-band CA receiver in accordance with the present disclosure.

FIGS. 6-7, as further described below, provide embodiments where two carriers are processed by cellular communications circuitry with independent paths without the need for additional external components (e.g., an LNA0 and power splitter). A single receiver circuit (hybrid) is configurable for processing non-CA, intra-band CA and inter-band CA signals.

FIG. 6 illustrates a circuit diagram embodiment for a hybrid intra-band/inter-band CA receiver in accordance with the present disclosure. In this embodiment, receiver circuit 600 shows a plurality of receive paths (path 1, path 2, and path 3) configured to support intra-band carrier signals. The intra-band CA signals pass through external common filter 601 (or duplexer) and matching network 602 that is optimized for a certain band (here denoted as band A). The filtered carrier signals are split into parallel receiving paths (e.g., path1 and path 2) and amplified by low-noise amplifiers LNA1 (604) and LNA2 (605), respectively. Programmable tuning network 603 inputs a tuning code to minimize the input return loss across band A in different modes of single LNA 1 (or LNA 2) or both LNA 1 and LNA 2 being on. In various embodiments, depending on the LNA circuit level implementation, programmable tuning network 603 includes access to both the input and output of the LNA1 (604) and LNA2 (605). The multimode dual LNA combination (consisting of 604, 605) facilitates the omission of an external LNA0 and power splitter in 500 (FIG. 5). It should be noted that, the matching network 602 is fixed on external PC-board and con not be changed in different modes of intra-band CA.

For an intra-band CA having for example two carriers, two upper processing chains (paths 1 and 2) are included. Additional carriers and corresponding additional processing chains are considered within the scope of the present disclosure. Also, various circuit elements may be shared or combined to provide the functionally equivalent carrier processing without departing from the scope of the present disclosure.

The local oscillator (LO1) 606 and mixer (mixer1) 607, centered at the BW of carrier 1, down-convert the intra-band CA signal for carrier 1 to baseband (BB I/Q) 611. For carrier 2, local oscillator (LO2) 608 and mixer (mixer2) 609, centered at the BW of carrier 2, down-convert the intra-band CA signal for carrier 2 to baseband (BB I/Q) 612. In order to reduce extra hardware, the baseband I/Q components for the second carrier signal are shared with the third receive path (path 3) for processing inter-band carrier signals (to be discussed further in FIG. 7). Multiplexer (MUX) 618 is a switch that controls which of the two signal paths (path 2 or path 3) provides the baseband signal 612. The selection is performed at baseband frequencies, where it is easier to achieve isolation between the two bands.

For intra-band carrier aggregation, the inter-band carrier aggregation path (path 3) remains powered-down (OFF). Filter 613 and impedance matching (performed by matching network 614) are not required for a second carrier as multiple carriers reside in the single band A. Since no signal is being processed by the third receive path (path 3), LNA3 (615), mixer3 (616) and LO3 (617) remain powered-down (OFF). This configuration reduces the overall power consumption of the receiver in addition to reducing the overall hardware space by sharing the baseband I/Q components for the second carrier signal between the second receive path and the third receive path.

For non-carrier aggregation (non-CA) signals, one receive path is powered-on in applicable band A or band B and the signal is down-converted to its baseband I and Q components.

FIG. 7 illustrates an aspect embodiment of a circuit diagram for a hybrid intra-band/inter-band CA receiver in accordance with the present disclosure. In this aspect embodiment, receiver circuit 700 shows a plurality of receive paths (path 1, path 2, and path 3) configured to support inter-band carrier signals. Receiver circuit 700 shows inter-band carriers passing through external filters 601 and 613 (e.g., Band A filtered through filter 601 and Band B filtered through filter 613). The filtered carrier signals undergo impedance matching by matching networks 602 and 614, respectively, which are each optimized for a particular band (here denoted as Band A and Band B). Band A receive path (path 1) is amplified through low-noise amplifier (LNA1) 604 and down-converted by local oscillator (LO1) 606 and mixer (mixer1) 607 to process the baseband components of the carrier 1 signal. For inter-band carrier aggregation, low-noise amplifier (LNA2) 605 and mixer (mixer2) 609 are powered-down (OFF) while low-noise amplifier (LNA3) 615, mixer (mixer3) 616 and local oscillator (LO3) 617 are powered-up (ON). Band B receive path (path 3) includes amplification through low-noise amplifier (LNA3) 615 and down-conversion by local oscillator (LO3) 617 and mixer (mixer3) 616 to process the baseband components of a carrier 2 signal. Local oscillators (LO1) 606 and (LO3) 617 operate at the respective center frequency of each of the first and second carriers (carriers 1 and 2).

In one embodiment, receiver circuits 600/700 support non-carrier aggregation. For example, LTE channel bandwidth (BW) scenarios where the RF BW for the channel (RFBW$_{ch}$) is less than or equal to twice the analog BW (BW$_{ana}$).

In one or more embodiments, receiver circuits 600/700 support contiguous intra-band CA. For example, the total number of aggregated carriers is divided into two clusters of carriers with an attempt to balance the cluster bandwidth where max (RFBW$_{cluster1}$; RFBWcluster2) is less than or equal to twice the BW$_{ana}$. In this scenario, two groups of carrier signals are down-converted to baseband components. In one embodiment, more than two contiguous carriers are received by treating the multiple carrier signals as two groups.

In one or more embodiments, receiver circuits 600/700 support non-contiguous intra-band CA. For example, if the available carriers can be divided into two clusters and the condition max (RFBW$_{cluster1}$; RFBW$_{cluster2}$)≤2×BW$_{ana}$ is met, it can be supported. Again, two groups of carrier signals are down-converted to baseband components. In one embodiment, more than two contiguous carriers are received by treating the multiple carrier signals as two groups.

Figure 8:
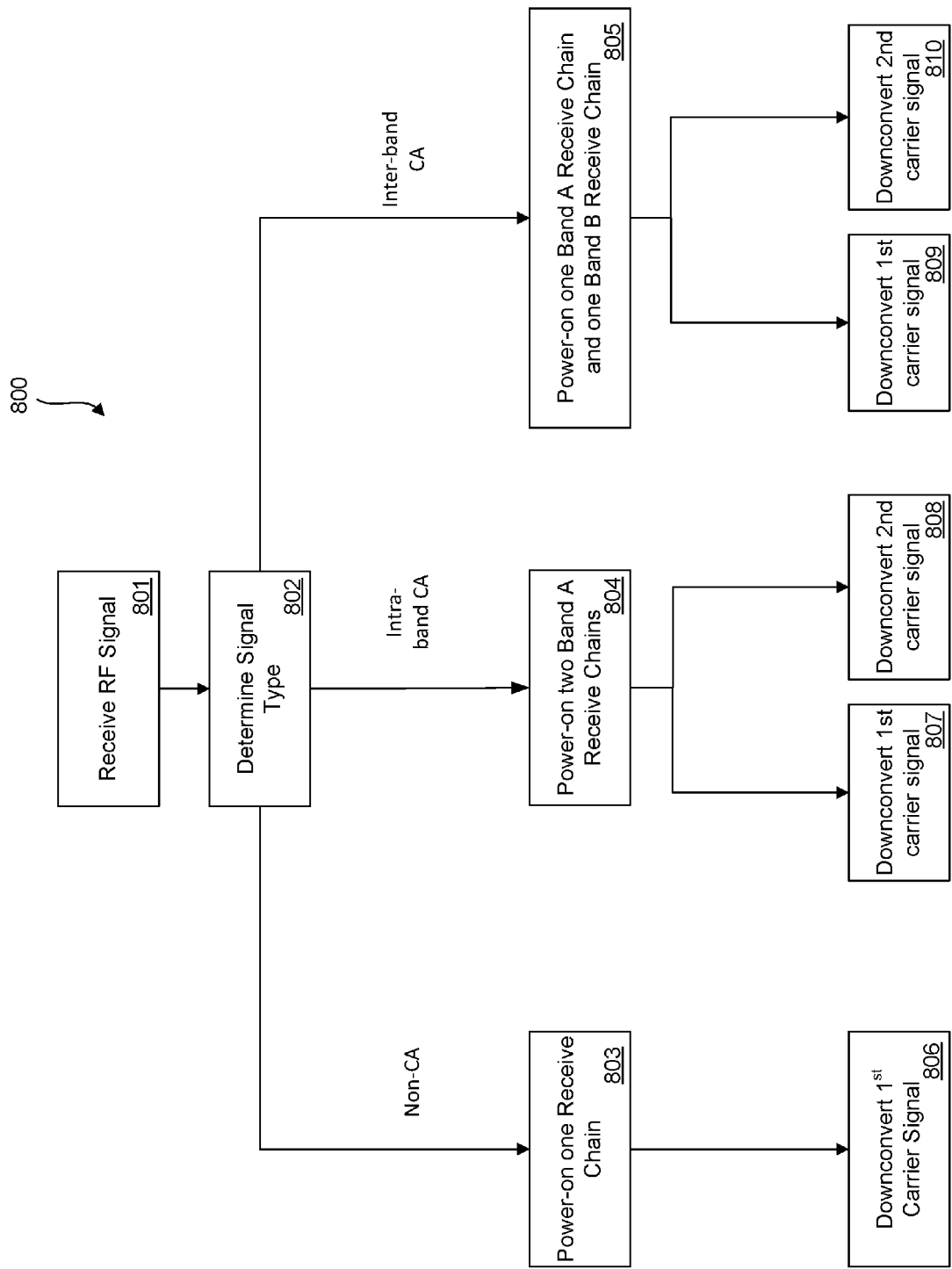
FIG. 8 illustrates a general flowchart of the process for receiving a radio frequency signal with one or more carriers in accordance with the present disclosure.

FIG. 8 illustrates a general flowchart of the process for receiving a radio frequency signal with one or more carriers in accordance with the present disclosure. The process is described for simplicity with one or two carriers within two bands of A and B, but additional carriers and bands are within the scope of the disclosure described herein. Process 800 begins when the receiver receives an RF signal in step 801. As previously discussed, the receiver architecture provides a plurality of receive paths (processing chains) that process non-CA, intra-band CA and inter-band CA signals. The circuit is configured to process the received RF signal by powering up (or down) various receive paths based on signal type. Therefore, the signal type is used to determine an active state of the receiver.

In step 802, the signal type (i.e., non-CA, intra-band CA or inter-band CA) is determined based on signal parameters such as bandwidth, spacing, and number of carriers. The receive paths of Band A and Band B (FIGS. 6 and 7) are powered-on (or selectively powered OFF as needed) based on the determined signal type in step 802.

In step 803, a non-CA signal (single carrier) is received and, as a result, one receive path is powered-on in applicable band A or band B and the signal is down-converted 806 to baseband I and Q components.

In step 804, an intra-band carrier aggregated signal is received and, as a result, a number of band A receive paths equal to the number of aggregated carriers (e.g., 2, 3, 4, 5, etc.) is powered-on (intra-band active state) and each of the paths down-converts using its respective carrier frequency (807 and 808) to respective baseband I and Q components.

In step 805, an inter-band carrier aggregated signal is received and, as a result, a number of band A receive paths equal to the number of carriers (e.g., 1, 2, 3, 4, 5, etc.) in band A are powered-on and a number of band B receiver paths are powered-on equal to the number of carriers (e.g., 2, 3, 4, 5, etc.) in band B (inter-band active state) and each of the paths down-converts using its respective carrier frequency (809 and 810) to respective baseband I and Q components.

In one example three path (processing chain) embodiment (two paths for band A and one path for band B); in order to conserve power, receive path circuitry is powered-down until it is needed. For example, an inter-band carrier signal is received by the receiver. Band A signals are processed through a first powered-on receive path while band B signals are processed through a third powered-on receive path. The second receive path remains powered-down while the first receive path and the third receive path are fully powered-on. In an alternative embodiment, an intra-band carrier signal is received by the receiver. Band A signals are processed through the first and second powered-on receive paths while the third receive path remains powered-down.

The technology described herein includes diagrams illustrating mixers and baseband blocks depicted as single block elements. It is understood by those skilled in the art that this is to simplify the diagram and that the RF signals are down-converted by a pair of I and Q mixers creating two signals of I and Q which are forwarded along two parallel analog baseband paths, each including a trans-conductance amplifier, a filter and an ADC. Two I/Q ADCs produce two sets of digital data streams that are processed by digital signal processing blocks to extract error free original transmitted data information.

As may be used herein, the term "external" refers to any structure or component not located within the same transceiver IC (chip). These external components are, in various embodiments, located on the same circuit board, other ICs, chips, or separate circuit boards. It is envisioned, in some embodiments, that "external" components would be co-located on the same IC with protective electrical/noise isolation between co-located transceiver and external components. The terms "path" and "processing chain" are interchangeable. The terms "substantially" and "approximately" provide an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operatively connected", "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry includes the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

The technology as described herein has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed technology described herein. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed technology described herein. One of average skill in the art will also recognize that the functional building blocks, and other illustrative blocks, modules and components herein, can be implemented as illustrated or by discrete components, application specific integrated circuits, processors executing appropriate software and the like or any combination thereof.

The technology as described herein may have also been described, at least in part, in terms of one or more embodiments. An embodiment of the technology as described herein is used herein to illustrate an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

While particular combinations of various functions and features of the technology as described herein have been expressly described herein, other combinations of these features and functions are likewise possible. The technology as described herein is not limited by the particular examples disclosed herein and expressly incorporates these other combinations.

What is claimed is:

1. Mobile communications circuitry comprising:
   filter circuitry, including at least a first filter and a second filter, configured to receive a multiple carrier aggregated signal including at least a first carrier with a first bandwidth and a second carrier with a second bandwidth;
   cellular communications circuitry coupled to the filter circuitry to process either an intra-band carrier aggregated signal or an inter-band carrier aggregated signal using selectively coupled common communications processing chains, the selectively coupled common communications processing chains grouped into at least a first set of communications processing chains coupled to the first filter to process the intra-band carrier aggregated signals and further grouped into at least a second set of communications processing chains coupled to the second filter to process the inter-band carrier aggregated signals; and
   wherein the selectively coupled common communications processing chains each further comprises at least a mixer and local oscillator to down-convert the first and second carriers to baseband components.

2. The mobile communications circuitry of claim 1 further comprising a power controller configured to:
   when the multiple carrier aggregated signal includes the intra-band carrier aggregated signal, power-on two or more communications processing chains of the first set; and
   when the multiple carrier aggregated signal includes the inter-band carrier aggregated signal, power-on one or more communications processing chains of the first set and one or more communications processing chains of the second set.

3. The mobile communications circuitry of claim 2, wherein the communications circuitry further comprises:
   the first filter to output a first radio frequency band including one or more carriers;
   the first set of two or more first communications processing chains to produce the baseband components, the two or more first communications processing chains coupled an output of the first filter;
   the second filter to output a second radio frequency band including one or more carriers;
   the second set of one or more second communications processing chains to produce baseband components, the one or more second communications processing chains coupled an output of the second filter; and
   a multiplexer coupling at least one communications processing chain from the first and the second sets.

4. The mobile communications circuitry of claim 1, wherein the selectively coupled common communications processing chains each further comprise at least a low noise amplifier.

5. The mobile communications circuitry of claim 1, wherein the selectively coupled common communications processing chains each further comprise one or more switches to selectively couple the first set and the second set of communications processing chains.

6. The mobile communications circuitry of claim 1, wherein the intra-band carrier aggregated signal includes two or more carriers separated into different channels.

7. A communications device to receive intra-band and inter-band carrier aggregation signals, the communications device comprising:
   a receiver circuit including:
      a first set of communications processing chains to down-convert, in a first mode, intra-band carrier aggregated signals of two or more carriers of differing bandwidth into baseband components; and
      at least one of the first set of communications processing chains to down-convert, in a second mode, a first band of inter-band carrier aggregated signals of one or more carriers of a first bandwidth into baseband components;
      a second set of communications processing chains to down-convert a second band of the inter-band carrier aggregated signals of one or more carriers of a second bandwidth into baseband components of one or more carriers when not coupled to at least one communications processing chain of the first set of communications processing chains; and
      a switch to selectively couple the first set and the second set of communications processing chains.

8. The communications device of claim 7, wherein the first set comprises two or more communications processing chains and the second set comprises one or more communications processing chains.

9. The communications device of claim 8 further comprising a power controller configured: in the first mode, to power-on the first set of two or more communications processing chains.

10. The communications device of claim 9 further comprising, in the second mode, the power controller to power-on at least one communications processing chain of the first set of two or more communications processing chains and to power-on at least one communications processing chain of the second set of one or more communications processing chains.

11. The communications device of claim 10 further comprising a power controller configured: in the first mode, to power-on the first set of two or more communications processing chains and power off the second set of communications processing chains.

12. The communications device of claim 10 further comprising a power controller configured: in the second mode, to power-on at least one communications processing chain of the first set and at least one communications processing chain of the second set and power off unused communications processing chains from both the first and second sets.

13. The communications device of claim 9 further comprising a power controller configured to power-off unused communications processing chains from both of the first and second sets.

14. The communications device of claim 9, wherein the communications processing chains of the first and second sets comprise at least a low noise amplifier, mixer and local oscillator.

15. The communications device of claim 14, wherein the local oscillator of each communications processing chain outputs a frequency to down-convert a carrier of the intra-band and inter-band carrier aggregation signals into baseband components.

16. A method producing baseband components from a received radio frequency signal comprising:
    determining whether the received radio frequency signal is a single carrier signal, an intra-band carrier aggregated signal with equal or unequal bandwidths, or an inter-band carrier aggregated signal with equal or unequal bandwidths;
    for the single carrier signal, powering-on a single down-conversion path coupled to an output of a first or second band filter which includes at least the single carrier;
    for the intra-band carrier aggregated signal, powering-on two or more down-conversion paths coupled to an output of the first band filter which includes carriers of the intra-band carrier aggregated signal;
    for the inter-band carrier aggregated signal, powering-on at least one down-conversion path coupled to an output of the first band filter comprising at least a first carrier of the inter-band carrier aggregated signal and powering-on at least one down-conversion path coupled to an output of the second band filter including at least a second carrier of the inter-band carrier aggregated signal; and
    down-converting the received radio frequency with the respective single, two or more, or at least one powered-on down-conversion paths to produce the baseband components for each carrier signal.

17. The method of claim 16, wherein the intra-band carrier aggregated signal comprises two equal bandwidth contiguous signals.

18. The method of claim 16, wherein the intra-band carrier aggregated signal comprises two unequal bandwidth non-contiguous signals.

19. The method of claim 16, wherein the intra-band carrier aggregated signals comprises two unequal bandwidth contiguous signals.

20. The method of claim 16, wherein the inter-band carrier aggregated signals comprises two carrier signals of unequal bandwidths separated by greater than 20 MHz.

* * * * *